United States Patent [19]

Chu

[11] Patent Number: 4,930,019

[45] Date of Patent: May 29, 1990

[54] MULTIPLE-USER INTERACTIVE AUDIO/VIDEO APPARATUS WITH AUTOMATIC RESPONSE UNITS

[76] Inventor: Chi Wai Chu, 2-88 Ma Ling Path, House No. 28, Windsor Park, Kau Tau Shan, Shatin, N.T., Hong Kong

[21] Appl. No.: 277,548

[22] Filed: Nov. 29, 1988

[51] Int. Cl.⁵ .......................... G09B 5/04; G09B 7/06; H04N 5/93
[52] U.S. Cl. .................................. 358/335; 360/19.1; 434/323; 434/307
[58] Field of Search ....................... 364/410, 411, 412; 434/307, 308, 321, 323, 335, 336, 337, 352; 360/19.1, 12, 27, 18; 358/335, 341

[56] References Cited

U.S. PATENT DOCUMENTS

| | | | |
|---|---|---|---|
| 2,562,179 | 7/1951 | Dorf | 434/352 |
| 3,934,226 | 1/1976 | Stone et al. | 434/308 |
| 4,464,124 | 8/1984 | Romero et al. | 434/321 |
| 4,569,026 | 2/1986 | Best | 364/440 |
| 4,673,357 | 1/1987 | Ito | 434/335 |

OTHER PUBLICATIONS

Sears, Roebuck and Co. Catalog, "The Great American Wish Book", 1989, pp. 409, 410, 416,420.

Primary Examiner—Steven L. Stephan
Assistant Examiner—Wilson D. Swayze
Attorney, Agent, or Firm—Edward B. Anderson

[57] ABSTRACT

A video cassette recorder plays an audio/video tape prerecorded with a video signal, three voice signals and three audio control signals. One of the voice signals is modulated with a carrier higher in frequency than the other voice signals for recording. The video image is displayed on a television monitor. The audio signals are coupled to a control unit which broadcasts one of the voice signals and transmits the other two with associated control signals to remotely located dolls. The dolls broadcast the voice signals according to the corresponding control signals. Hand-held switch units allow individuals to preempt broadcasting by the dolls to permit the individuals to interject their own vocal responses.

1 Claim, 3 Drawing Sheets

MULTIPLE-USER INTERACTIVE AUDIO/VIDEO APPARATUS WITH AUTOMATIC RESPONSE UNITS

FIELD OF THE INVENTION

This invention relates to apparatus using an audio prerecorded medium, and particularly, to such an apparatus for providing interaction between a plurality of remote units.

BACKGROUND OF THE INVENTION

Systems presently exist which provide for an individual to interact with the video display of a computer software application program. The video monitor displays preparatory information followed by questions for the individual. Time is provided to allow the individual to input information via a keyboard or mouse. The system then responds with further displays based on the individual's response.

Further, game apparatus exist with a control unit having an infrared transmitter and receiver. An action episode is displayed on a television monitor and signals are transmitted to the remote unit indicating a characteristic relating to the game. For instance, the player may be a pilot and the pilot's plate is "shot down". Conversely, the player/pilot can fire the infrared beam upon the image in the televisiion screen with the effectiveness of the pilot's shooting being registered on the screen after having been received by the receiving unit.

Such systems are based merely on the existence or nonexistence of a predetermined infrared signal, and do not provide for interaction on a conversational level between the control unit associated with the television monitor and a remote unit. Further, there are no known systems which allow an individual to participate in addition to or in lieu of a remote unit.

SUMMARY OF THE INVENTION

The invention overcomes these limitations of the known prior art by providing apparatus in which there is interaction provided between at least a pair of remote units. Further, in another aspect of the invention, there is provided the ability of individuals to respond through an indicator unit to preempt the response of one of the remote response units and interject her or his own response.

The invention generally provides a player-interactive apparatus usable in effect with an audio player. An audio medium is included which is playable on the player and prerecorded with preferably conversational information on an audio track with at least two voice signals. Each voice signal is associated with a different one of the remote units. The audio track also has a control signal indicative of times when the voice signal associated with a second one of the remote units is occurring on the audio track.

A decoder couplable to the player decodes the audio signal produced from the audio track into the first and second voice signals and the control signal. A first speaker is coupled to the decoder for broadcasting the first voice signal. A control transmitter is coupled to the decoder for transmitting the second voice signal and the control signal. A receiver is spaced remotely from the control transmitter for receiving the second voice signal and control signal. The second voice signal is then broadcasted from a second speaker coupled to the receiver.

In the preferred embodiment of the present invention a control unit receives the audio signal from a video tape recorder which plays a prerecorded video tape having an audio track with two audio channels and a control channel recorded thereon. One of the audio channels contains a voice signal which relates to a character displayed on the television monitor. The second audio channel contains the two other voice signals which are associated with a pair of remote characters, such as dolls, placed in front of and away from the control unit and television monitor. These other voice signals are transmitted to the dolls from the control unit, with a particular doll responding when a control signal associated with that doll is sent. Further, separate indicator units are operable by individuals to prevent the playing of the doll voice signals by the dolls. Time is then provided for the individual to interject her or his own response.

It can be seen that such an apparatus provides for the interaction of separate characters as well as the additional interaction of individuals with the conversation taking place between the separate characters. These and other features and advantages of the present invention will become more apparent from a review of the following detailed description of the preferred embodiment and the associated drawings.

DETAILED DESCRIPTION OF THE PREFERRED EMBODIMENT

Figure 1:
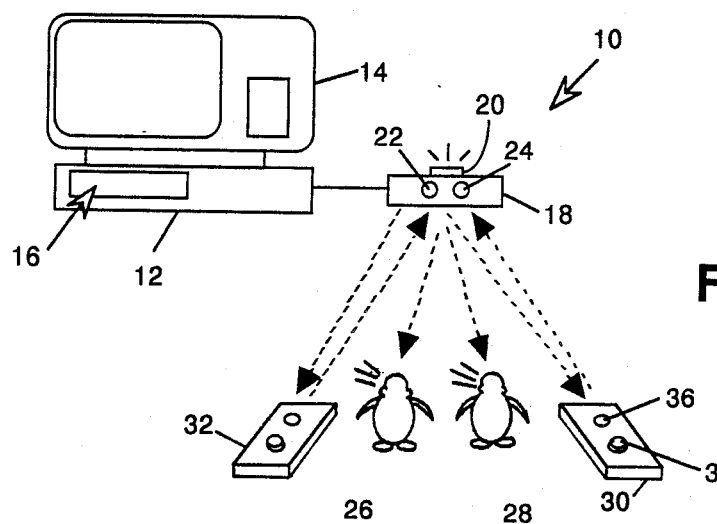
FIG. 1 is a block schematic illustrating the general arrangement and use of the preferred embodiment of the present invention.

Referring initially to FIG. 1, shown in a simplified diagram is a player-interactive audio/video apparatus 10 made according to the invention. Apparatus 10 is usable with a conventional video cassette recorder (VCR) 12 and a television monitor 14 to which the VCR is connected for transmitting the video signal of an audio/video recording medium, in this case a prerecorded tape 16. The sound of monitor 14 is preferably turned off.

When tape 16 is played on VCR 12, the audio signal is conveyed to a control unit shown generally at 18. The control unit includes a speaker 20, an infrared transmitter 22 and a receiver 24. As will be described in further detail, a first audio signal is broadcast from speaker 20 in association with a character or voice source displayed on the screen of monitor 14. Other voice signals are received from the audio track and transmitted in this case to one or both of two characters (voice sources) or dolls 26 and 28. The dolls receive the voice signals and broadcast them through speakers preferably associated with their mouths. Further, one or more response indicating units, such as units 30 and 32 each have a manually operable push button 34, an LED transmitter and receiver not shown in this figure, and a response indicating light 36.

Figure 7:
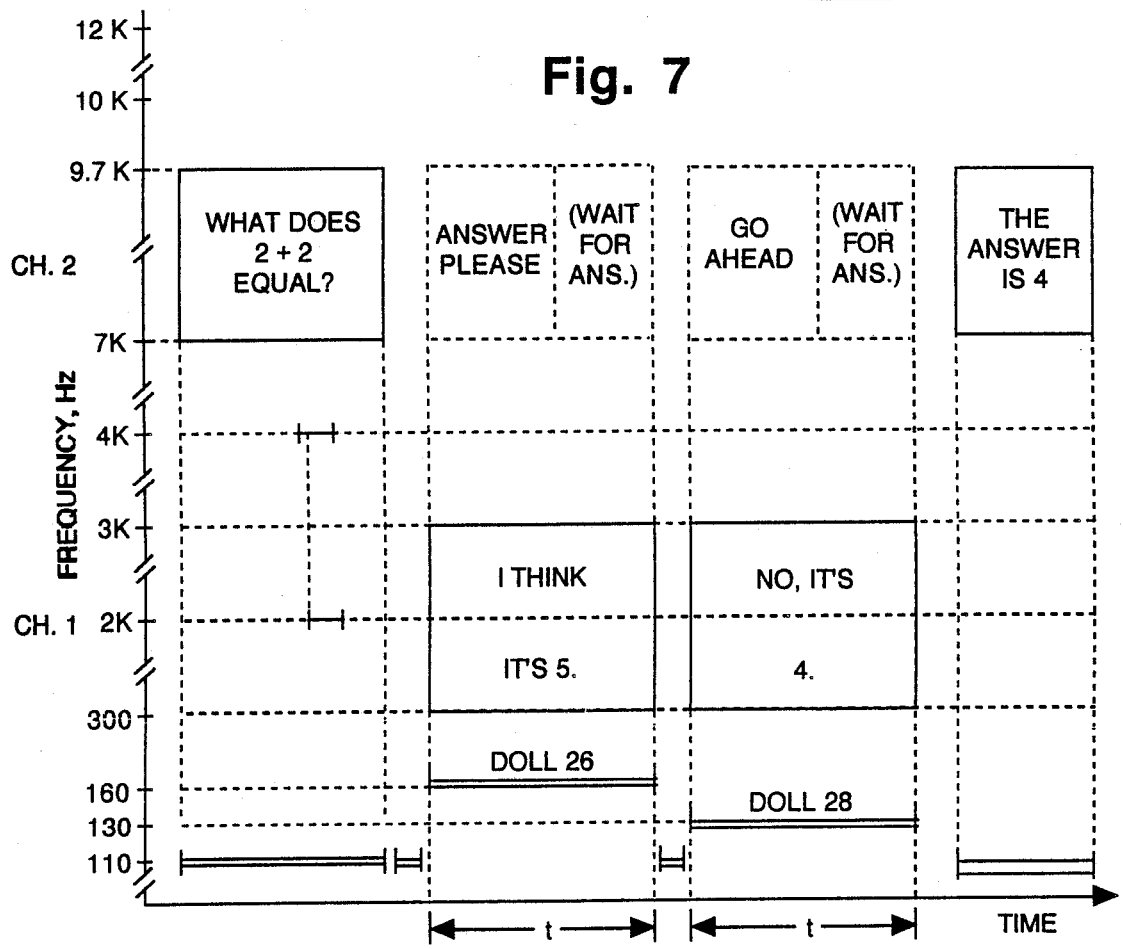
FIG. 7 is a chart over time showing in simplified form the frequency allocation of voice and control signals during operation of the control unit, response units, and individually operable indicator units of FIG. 1.

Referring next to FIG. 7, an exemplary prerecorded audio track is shown. The vertical left hand axis of this figure shows the frequency range on the audio track at which each particular signal is recorded. The horizontal axis represents the passage of time as the audio/video tape is played on VCR 12. A first audio channel (referred to as channel 2) is recorded in the frequency range of 7 kHz to 9.7 kHz. The typical frequency range of the audio track is between 10 Hz and 12 kHz. Thus, several audio channels can be placed on the audio track of the tape if properly modulated by a corresponding carrier signal. A second audio channel (channel 1) is recorded in the frequency range 300 Hz to 3 kHz. These two audio channels represent a conversation between characters. The first audio channel relates to the voice of a character displayed on the television monitor. The voice signals on the second audio channel are those associated with dolls 26 and 28. It will be understood that a single doll could be used or more than two, as is desired. Further, the interaction could also be only between the dolls.

The first audio channel also preferably includes music, special sound effects, educational material and descriptive information ending with a question. In the example shown the question is "What does 2+2 equal". During the time period during which this question is asked only the television character is talking and a control tone of 110 Hz is concurrently occurring on the audio track.

For a short duration of time after the question is asked, there is a short 110 Hz pulse on the audio track. It is possible prior to this pulse for an individual holding an indicator unit 30 or 32 to press the manual switch. The first one to press the manual switch transmits an indicating signal of 4 kHz to control unit 18. Unit 18 recognizes that indicating signal and retransmits a 2 kHz tone for about one half second back to all of the indicating units. This retransmitted signal disables all of the indicating units except for the one which was first pushed.

Upon receipt of this disabling signal, indicating light 36 then lights up on the unit which had the manual switch pressed prior to receipt of the disabling signal. Light 36 is lit to indicate that that individual may respond. During this response time, as shown in the answer in dashed outline, the television character (channel 2) states "Answer please". A period of time is then allowed during which the television characters and dolls wait for the individual to answer.

Alternatively, if no individual has pressed the indicator button, one of the dolls is selected to answer the question. The doll selection is determined by the appropriate control signal which exists on the audio track of the tape. In the example shown doll 26 has a control tone frequency of 160 Hz associated with it, whereas doll 28 has a control tone of 130 Hz associated with it.

Both dolls receive the voice signal on channel 1 as well as the doll-indicating control tone.

Only the doll who is set to respond to the concurrently transmitted doll control signal will answer the question. In the example shown in FIG. 7, doll 26 answers first and doll 28 answers second, so long as no individual interjects his or her own response through the use of an indicating unit. It is also possible to have both doll control tones sent at the same time. This results in both of the dolls answering simultaneously. This example is not shown. Similarly, with concurrent recording on channels 1 and 2, both the television character and one or more doll characters could be made to respond concurrently. After each doll has answered, or an individual responds in lieu of one or both of the doll answers, the television character responds with the answer. In this case it is "the answer is 4". Again at this time only the conversation on channel 2 and the 110 Hz main control signal occur on the audio track of the audio/video tape.

In summary it can be seen that the audio track includes a conversation of three voice signals on two channels and three control signal channels, each channel having its discrete frequency band in the audio range of the audio track. The audio track has frequency "space" to accommodate several voice and control channels.

Figure 5:
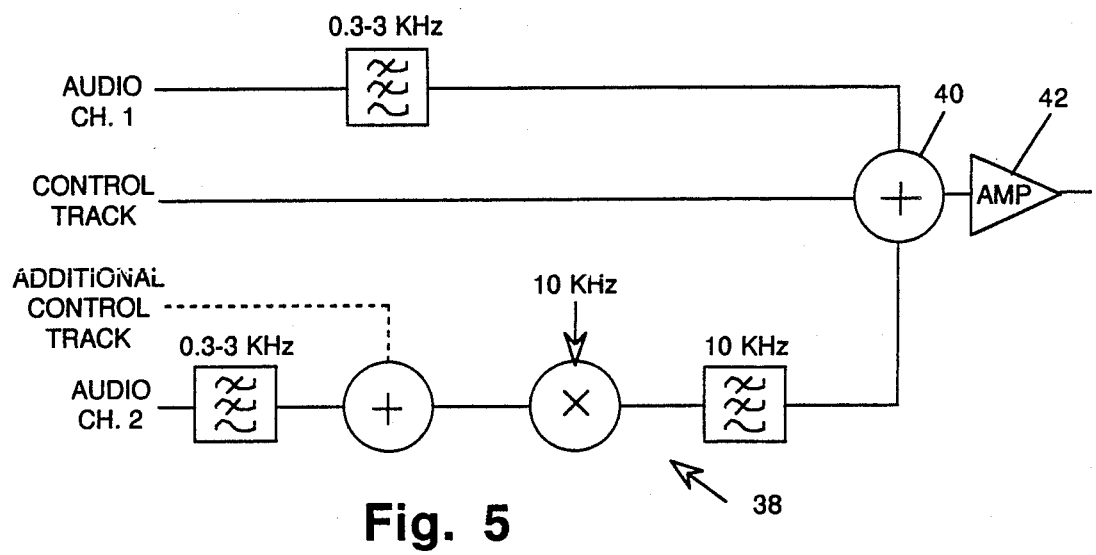
FIG. 5 is a generalized functional block diagram showing formation of the audio signal recorded on the video cassette tape playable in the embodiment of FIG. 1.

FIG. 5 illustrates how these various audio signals are applied to the audio track of tape 16. Channel 1 having a bandwidth of 300 Hz to 3 kHz corresponding to the actual voice signal bandwidth remains at that frequency range. The control channels shown are also unmodulated. However, audio channel 2 is converted to a 7 kHz to 9.7 kHz frequency band by the use of a balanced mixed modulator shown generally at 38 using conventional techniques. The various signals are cleaned up as appropriate by using bandpass and lowpass filters as appropriate. The various signals are combined at a summing unit 40 and output through an amplifier 42 to the recording head recording onto the audio track. It will be noted that an additional control track could be modulated with audio channel 2 for recording in the frequency range 9.7 kHz to 10 kHz, if desired. However, in the preferred embodiment, this control track is not used.

Figure 6:
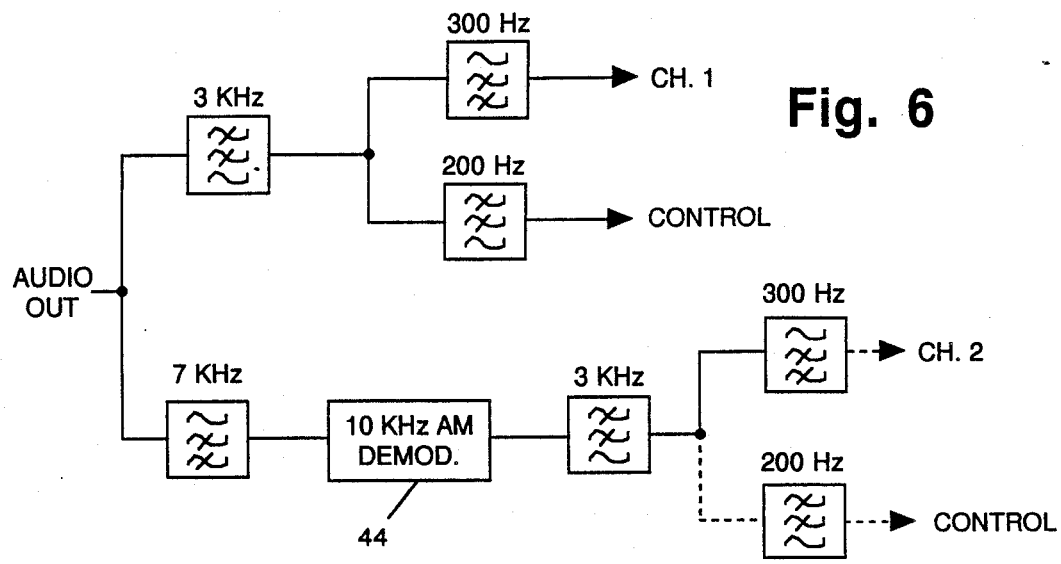
FIG. 6 is a block diagram similar to FIG. 5 showing the separation of the signal recorded on the audio track into the various voice channels and control signals for use in operating the embodiment of FIG. 1.

FIG. 6 shows how the audio signals on the audio track of the tape are decoded into the various channels and control signals. Similar to the case with the modulating to record the audio signals, a balanced mixed modulator 44 is used to demodulate channel 2 back into the original 0.3-3 kHz frequency range. When the extra control track is used its demodulation occurs along with that of the main channel. Initially the two channels are separated into separate paths using a lowpass 3 kHz filter and a highpass 7 kHz filter. Once the approximately 3 kHz frequency range is obtained for each channel, a highpass filter set at 300 Hz removes the control signals from the voice signal and a 200 Hz lowpass filter further separates the control signals.

Figure 2:
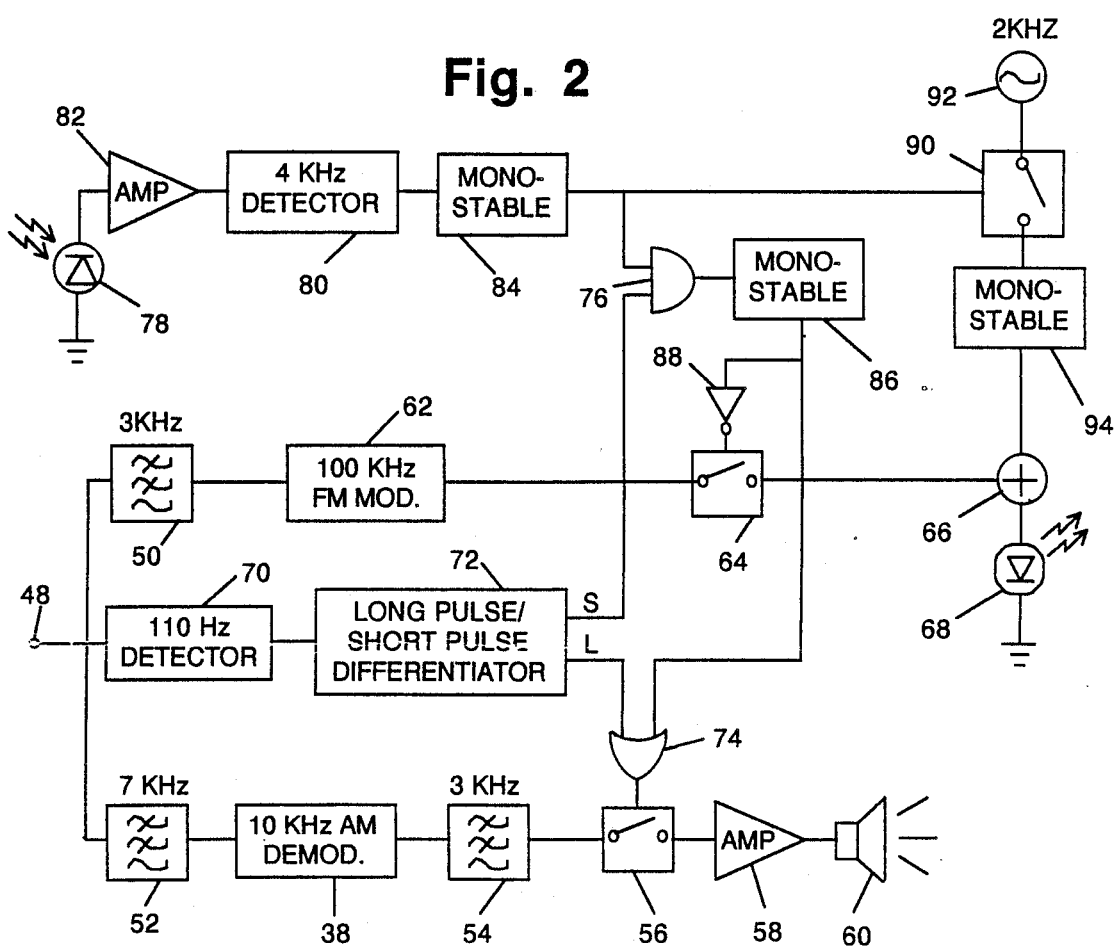
FIG. 2 is a block schematic showing construction of the control unit of the embodiment of FIG. 1.

This decoding is accomplished by the control unit shown generally at 18 in FIG. 2. The audio input signal is input at 48 and directed both into a 3 kHz lowpass filter 50 and a 7 kHz highpass filter 52. The audio signal in the upper frequency band is demodulated by balanced mixed modulator 38 described previously. The resulting demodulated audio signal is then fed through a 3 kHz lowpass filter 54 to a first switch unit 56 which couples the signal through an amplifier 58 to a control unit speaker 60.

The signals in the second voice channel and doll control signals output from filter 50 are frequency modulated at a modulator 62 with a 100 kHz carrier. This carrier was chosen because it is high enough to transmit the 3 kHz bandwidth, and yet is not too high for the corresponding infrared receiver to respond to it. The modulated signal then passes through a second voice signal switch 64 and a signal summing unit 66 to an LED infrared transmitter 68.

A 110 Hz detector 70 receives the audio signal and detects the occurrence of the 110 Hz control signal which occurs with a voice signal on channel 2. It is transmitted to a differentiator 72 which determines whether the tone is in the form of a short pulse, or a long pulse. A short pulse indicates that a doll's speech immediately follows. A long pulse occurs concurrently with dialogue on channel 2. If a long pulse is detected, a logic true pulse is input to an OR gate 74, the output of which gate is connected to switch 56. Thus, when the 110 Hz tone is detected switch 56 is closed. This allows the television-associated voice signal on channel 2 to be broadcast from speaker 60. If a short pulse occurs, a logic false pulse is input to gate 74 and a logic true pulse is input to an AND gate 76.

An infrared receiver 78 is coupled to a 4 kHz tone detector 80 through an amplifier 82. Receiver 78 receives a 4 kHz tone (indicating signal) produced by an indicating unit 30 or 32. When a 4 kHz tone is detected, a signal is sent to a monostable 84. This monostable outputs a pulse which is long enough to last the length of a television character question or a doll response. In order to preempt the doll response, the monostable output and the short 110 Hz tone must occur at the same time. The output of this monostable is a second input to AND gate 76. Thus, a true output from the AND gate results when a 4 kHz tone is detected by detector 80 followed by a short 110 Hz control tone on the audio track of the audio/video tape.

When the logic output of AND gate 76 is true or high, an output pulse having the duration of a doll response is output from a second monostable 86. This output pulse is connected to a second input of OR gate 74 and also to switch 64 through an invertor 88.

The output of monostable 84 also operates a third switch 90. Switch 90 couples a 2 kHz oscillator 92 to transmitter 68 through a third monostable 94 and summing unit 66. Thus, when the 4 kHz tone (indicating signal) is detected, a 2 kHz tone, also referred to as a disabling tone (for reasons which will be seen), is transmitted by transmitter 68. Also, when the output of monostable 86 is high, switch 64 is opened and switch 56 is closed. Thus, any voice signal on channel 2 related to the television character (such as "Answer please.'-'—FIG. 7) is broadcast on speaker 60.

Figure 3:
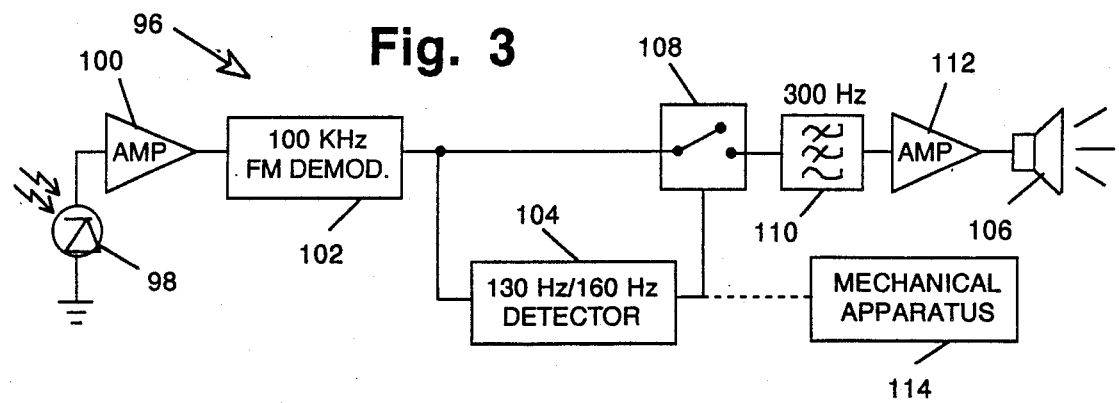
FIG. 3 is a block schematic showing construction of the remote character units of the embodiment of FIG. 1.

The block circuit diagram for a response unit 96 contained within dolls 26 and 28 is shown in FIG. 3. Response unit 96 includes an infrared receiver 98 the output of which passes through an amplifier 100 to a 100 kHz F.M. demodulator 102 and to the input of a 130 Hz or 160 Hz detector 104. This detector, depending on which doll it is associated with, will detect either the 130 Hz tone or the 160 Hz tone in the audio signal which is transmitted by control unit 18.

The output of demodulator 102 is connected to a speaker 106 through a switch 108, a 300 Hz high pass filter 110, and an amplifier 112. The output of detector 104 operates switch 108 so that when the tone designated for the particular doll is detected the switch is closed and the corresponding voice signal from channel 1 is broadcast in speaker 106. Since the 130 Hz or 160 Hz tone occurs throughout the duration of the response of the doll, switch 108 is maintained closed during the entire response. However, when the tone ends, thus indicating the end of the response, switch 108 is opened, so that any transmissions to other dolls are not broadcast.

If desired, the dolls can have a mechanical apparatus 114 associated with them which may provide for moving the dolls' legs, arms, heads and mouths to make them appear to be speaking and acting more naturally. Such apparatus is not included within the scope of the present invention, and is therefore not described in this preferred embodiment.

Figure 4:
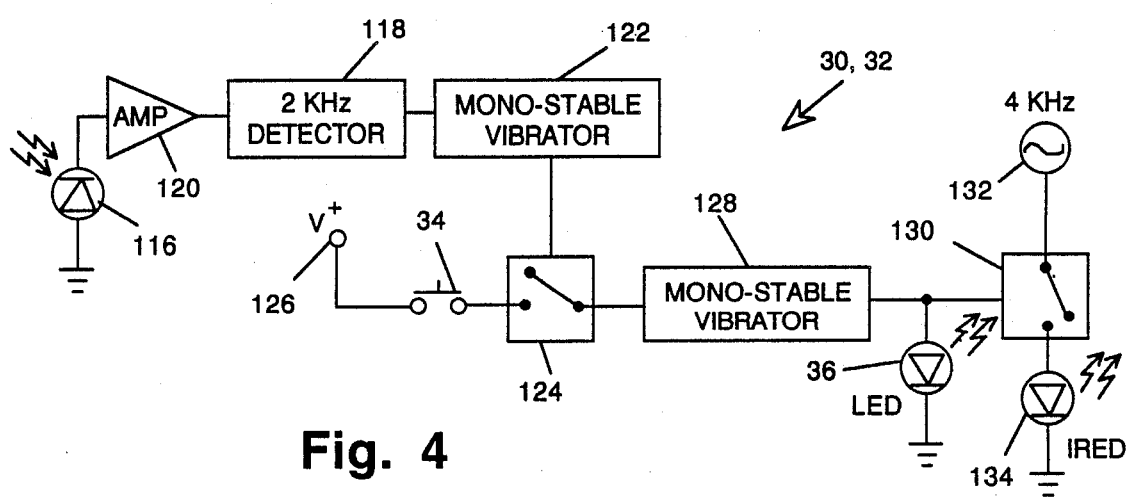
FIG. 4 is a block schematic showing construction of the remote indicator units of the embodiment of FIG. 1.

Referring now to FIG. 4, a block diagram for the response indicating units 30 and 32 is shown. The diagram of FIG. 4 applies to both units 30 and 32, which are identical. It will be understood in the following discussion that although reference to a single indicating unit 30 is used, the comments apply equally well to unit 32, and for that matter, any additional indicating units that are used.

Unit 30 includes an infrared receiver 116 which is coupled to a 2 kHz tone (disabling signal) detector 118 through an amplifier 120.

The output of detector 118 is coupled through a monostable 122 to a switch 124. The switch joins a voltage source 126 via manually operable switch 34 to another monostable 128. Thus, when a 2 kHz tone transmitted by control unit 18 is received in indicating unit 30, switch 124 is opened, thereby preventing the operation of manual switch 34 from activating the circuit. Switch 124 is thus in a normally closed state. Monostable 128 outputs a short pulse which is long enough for control unit 18 to receive it and transmit the 2 kHz tone, which is then used to disable the indicating units.

The output of monostable 128 is connected to another switch 130 which couples a 4 kHz oscillator (indicating signal) 132 to an infrared transmitter 134. The output of the monostable is also coupled to LED lamp 36 mounted on the housing of indicating unit 30. Light 36 is only lit when manual switch 34 has been pressed at a time when no 2 kHz tone was transmitted by control unit 18. Immediately after the 4 kHz tone is transmitted, the disabling (2 kHz) tone is transmitted by the control unit, and the indicating units are disabled.

Since every individual associated with video apparatus 10 has an indicating unit 30 or 32 to use, essentially only the first person to press the associated button 34 will have her or his corresponding light 36 lit. The reason for this is that the speed with which control unit 18 senses the output of the response signal from transmitter 134 and retransmits a corresponding disabling signal which is received by receiver 116 is very short. Thus, typically, except for the individual who has pushed the button first, the other indicating units will be disabled by the operation of switch 124 when the 2 kHz disabling tone is detected. Thus, unless two individuals happen to operate their units simultaneously, only one unit will have a light which is lit. It will be understood that an audible buzzer or tone could also be made to sound on indicator unit 30 at the same time light 36 is lit.

It will be seen that a VCR apparatus is provided in the preferred embodiment of the present invention which allows a character such as doll 26 or 28 to respond to conversations and other audio information associated with another remote unit, such as a television monitor image. There is thus what appears to be direct interaction between these two types of characters. Further, by the use of an indicating unit, an individual can interject his or her response by appropriately pressing a button on the indicating unit to preempt the corresponding response of one of the dolls. Such an apparatus can be very effective in presenting educational programs to children. The children are able to interact with the doll characters as well as the television character and participate in the educational process.

It is apparent that many forms of information could be provided for the video image and that various forms of audio information can be conveyed which produces the desired interaction. The system can be set up so that a plurality of the dolls respond with the same response at the same time by concurrently sending control signals for each of them. One or more of the dolls could respond concurrently and in unison with a character on the television screen by also providing the television associated control signal at the same time the doll signal is sent. In addition, the entire interaction could be made to take place between only dolls or the dolls could ask the questions. A simplified system could be created in which all the voice signals are time multiplexed on a single audio channel of the recording medium. In line with this, the control signal(s) could indicate a time(s) for the voice signal(s) to occur other than the times it occurs (they occur) on the prerecorded medium.

Thus, an apparatus and method for performing an audio interaction according to the invention can take on various forms and structures. It will therefore be appreciated by those skilled in the art that although the present invention has been described with reference to the preceding preferred embodiment, variations in form and detail can be made without varying from the spirit and scope of the invention as defined in the claims.

I claim:

1. A player-interactive audio/video apparatus usable with a video monitor and a video cassette player connectable to the monitor for displaying a video signal comprising:

an audio/video tape having an audio track and a video track, playable on the player and prerecorded with video display information on the video track for producing the video signal when played back on the player, said tape also being prerecorded with an audio signal on the audio track comprising a first voice signal associated with the video signal, a second voice signal not associated with the video signal, and three control signals, the two voice signals and three control signals being recorded with separate bandwidths of the audio track;

a control unit connectable to the player for receiving the audio signal when said tape is played on the player, said control unit comprising: a decoder for decoding the audio signal into separate voice signals and control signals; a first voice speaker responsive to the first voice signal for broadcasting the first voice signal; means for detecting a first of the control signals in the audio signal; first voice switch means disposed between said decoder means and said first voice speaker and controllable for selectively coupling the first voice signal to said first voice speaker; first transmitter means for transmitting the second voice signal and the second and third control signals remotely from said control unit; second voice switch means controllable for selectively coupling the second voice signal and the second and third control signals to said first transmitter means; means for generating a disabling signal distinct from the first, second and third control signals; third switch means controllable for selectively coupling the disabling-signal generating means to said first transmitter means; first receiver means for receiving an indicating signal remotely transmitted; detector means coupled between said first receiver means and said third switch means and responsive to a received indicating signal for operating said third switch means in a manner transmitting the disabling signal for a predetermined period of time when the indicating signal is received;

a plurality of automatic response units positionable remotely from said control unit, each comprising: a second receiver means for receiving the transmitted second voice signal and second and third control signals; a second speaker means for broadcasting said second voice signal; fourth switch means controllable for selectively connecting said second receiver means to said second speaker means; a detector means responsive to a predetermined one of the second and third control signals for operating said fourth switch means in a manner connecting said second receiver means to said second speaker means when the predetermined one of the control signals occurs; and a plurality of manually operable indicator units positionable remotely from said control unit and said response units, each indicator unit comprising: manually operable switch means; means for generating an indicating signal; indicator transmitter means for transmitting the indicator signal remotely of said indicator unit; first indicator switch means controllable for selectively coupling said indicator signal generating means to said indicator transmitter means; second indicator switch means controllable for selectively coupling said manual switch means to said first indicator switch means; and indicator receiver means responsive to a received disabling signal for controlling operation of said first indicator switch means in such a manner that said first indicator switch means is open when said disabling signal is received by said indicator receiver means, thereby preventing transmission of the indicating signal when said manual switch is operated.

* * * * *